US007137140B2

(12) United States Patent
Safa

(10) Patent No.: US 7,137,140 B2
(45) Date of Patent: Nov. 14, 2006

(54) TRANSACTION VERIFICATION

(75) Inventor: John Aram Safa, Nottingham (GB)

(73) Assignee: Simplex Major SDN.BHD, Selangor DE (MY)

( * ) Notice: Subject to any disclaimer, the term of this patent is extended or adjusted under 35 U.S.C. 154(b) by 918 days.

(21) Appl. No.: 09/905,572

(22) Filed: Jul. 13, 2001

(65) Prior Publication Data

US 2002/0010864 A1 Jan. 24, 2002

(30) Foreign Application Priority Data

Jul. 18, 2000 (GB) ................................. 0017479.7

(51) Int. Cl.
*G06F 17/30* (2006.01)
(52) U.S. Cl. .............................. 726/6; 726/18; 726/21
(58) Field of Classification Search ........ 713/200–202; 726/2, 3, 4, 6, 18, 21
See application file for complete search history.

(56) References Cited

U.S. PATENT DOCUMENTS

| | | |
|---|---|---|
| 4,885,777 A | 12/1989 | Takaragi et al. |
| 5,337,357 A | 8/1994 | Chou et al. |
| 5,521,980 A | 5/1996 | Brands |
| 5,668,878 A | 9/1997 | Brands |
| 5,696,827 A | 12/1997 | Brands |
| 5,793,028 A | 8/1998 | Wagener et al. |
| 6,023,509 A | 2/2000 | Herbert et al. |
| 6,078,902 A | 6/2000 | Schenkler |
| 6,131,162 A | 10/2000 | Yoshiura et al. |
| 6,148,407 A | 11/2000 | Aucsmith |
| 6,948,168 B1 | 9/2005 | Kuprionas |

FOREIGN PATENT DOCUMENTS

| | | |
|---|---|---|
| GB | 2 355 322 | 4/2001 |
| WO | 97/50207 | 12/1997 |
| WO | 98/44402 | 10/1998 |
| WO | 00/31644 | 6/2000 |

OTHER PUBLICATIONS http://www.east-shore.com/verify.html.*
http://www.divassoftware.com/services/securityNet.htm.*
http://biz.yahoo.com/pz/050131/71730.html.*
Access control system with high level security using fingerprints, Younhee Gil; Dosung Ahn; Sungbum Pan; Yongwha Chung; Applied Imagery Pattern Recognition Workshop, 2003. Proceedings. 32nd, Oct. 15-17, 2003 pp. 238-243.*
Fingerprint multicast in secure video streaming, Zhao, H.V.; Liu, K.J.R.; Image Processing, IEEE Transactions on, vol. 15, Issue 1, Jan. 2006 pp. 12-29.*
Forensic analysis of nonlinear collusion attacks for multimedia fingerprinting, Zhao, H.V.; Min Wu; Wang, Z.J.; Liu, K.J.R.; Image Processing, IEEE Transactions on, vol. 14, Issue 5, May 2005 pp. 646-661.*
Lang, Paul, "How to Beat Credit Card Fraud," NETrageous Inc., Olney, MD. http://web.archive.org/web/20000118013545/http://scambusters.org/reports/lang.html.

* cited by examiner

*Primary Examiner*—David Jung
(74) *Attorney, Agent, or Firm*—Smith-Hill and Bedell

(57) ABSTRACT

A customer computer 12, vendor computer 16 and verification computer 14 are interconnected by means of a network 18, such as the internet The customer 12 can initiate a transaction, such as the purchase of information from the vendor 16. However, the vendor 16 will not proceed until verification of the transaction has been received from the site 14. This is not provided until the customer 12 has sent a unique fingerprint of data to the site 14, identifying the customer machine by reference to hardware device types or serial numbers, software types or licences, e-mail addressed or the like. This fingerprint is stored for future reference in showing that the transaction was validly implemented by the customer machine 12.

37 Claims, 2 Drawing Sheets

TRANSACTION VERIFICATION

CROSS REFERENCE TO RELATED APPLICATION

Figure 1:
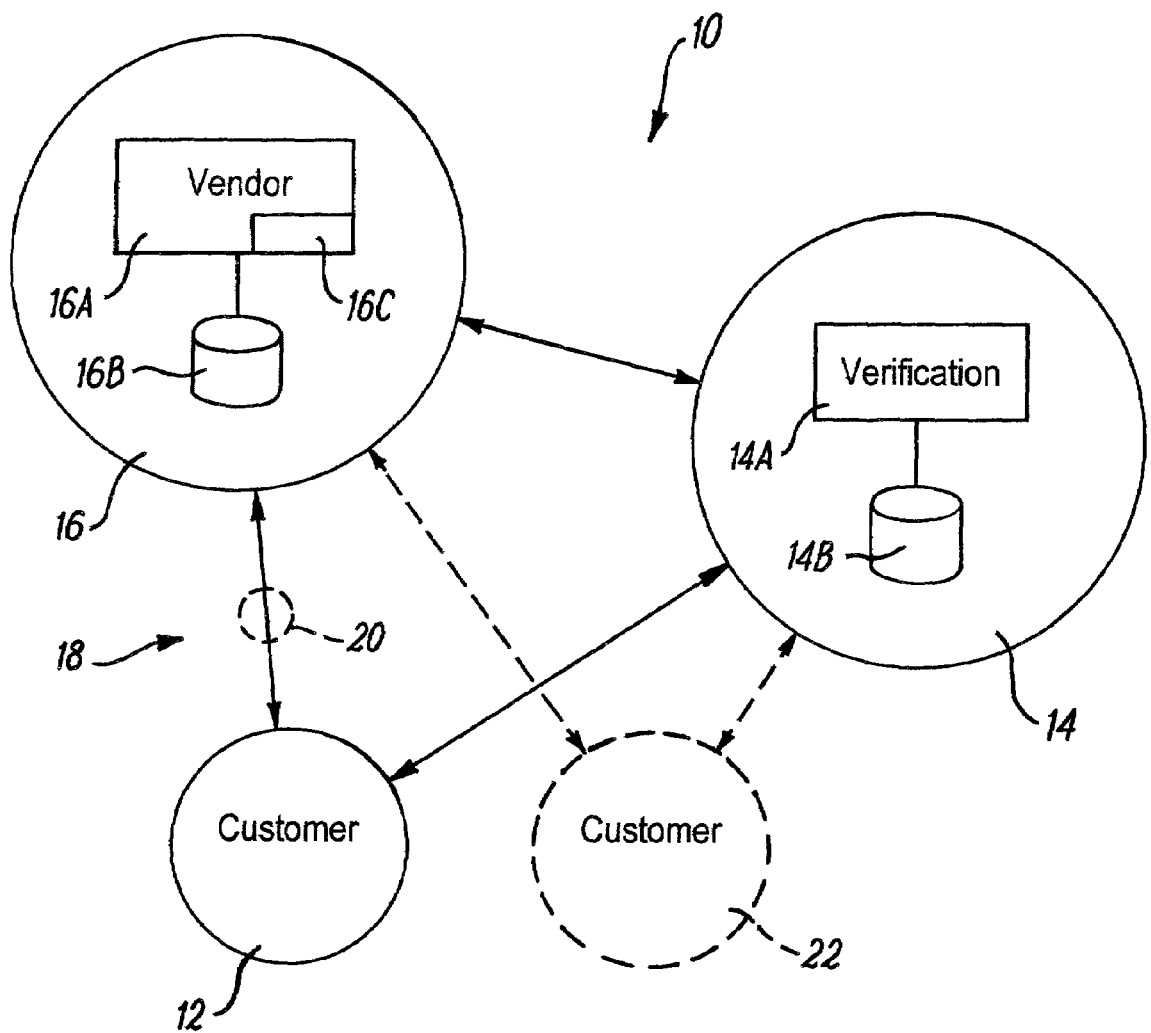

This application claims priority under 35 USC 119 of United Kingdom Patent Application No. 0017479.7 filed Jul. 18, 2000.

The present invention relates to transaction verification and in particular, to a system for verification of transactions executed by means of computer-based networks.

Commercial transactions conducted by means of computer networks, such as the internet, are becoming increasingly common. These transactions are often termed "e-commerce". It is important to provide adequate security for these transactions if businesses based on them are to be successful. Various encryption techniques have been proposed for providing security, but have not proved entirely successful. In particular, the encryption technique being used by the sender must be understood by the recipient in order for the recipient to be able to decrypt the information sent. This gives rise to compatibility problems in practice, at least until encryption techniques become standardised. Therefore, there exists a problem in providing a system by which e-commerce transactions can be executed, but which is constructed in a manner which allows transactions to be verified in advance, by an arrangement which presents minimal technical constraints on the user. This allows the equipment of a wide range of users to be technically compatible with the system without extensive modification or setting up procedures, which would act as a deterrent to the use of the system.

The present invention provides a transaction verification system for use in verifying transactions between computers connected by a computer network, the system comprising fingerprint means operable in association with at least one first computer of the network to seek information relating to the first computer in order to create a group of data to serve as a fingerprint which is substantially unique to the first computer, and to provide the fingerprint for transmission to a second computer when the first computer is operated to initiate a transaction, to allow the source of the transaction initiation to be substantially uniquely identified.

The fingerprint preferably includes data which identifies components of the system of the first computer. The fingerprint may include data relating to hardware present within the first computer, or to software present within the first computer. The fingerprint may further include data input by the user in response to a prompt provided by the fingerprint means.

The second computer may store the fingerprint in association with details of the transaction, for future reference to identify the first computer. The second computer is preferably operable to provide a message confirming that the fingerprint has been stored and authorising the transaction to proceed. The second computer may be operable to store, with the fingerprint, the route by which the fingerprint travelled across the network, including details of any servers through which the fingerprint passed. The second computer may use the fingerprint to provide active verification of the validity of the transaction. The second computer may be operable to effect a payment authorisation in response to receiving details of the transaction. The second computer may incorporate a database operable to identify the payment required and/or made in relation to the transaction. The second computer may contain stored fingerprint data for comparison with a fingerprint created at the time of a transaction, for authorising the transaction in accordance with the result of the comparison.

The first computer may comprise transaction means operable to create a transaction request identifying a required transaction, and means operable to transmit the transaction request over the network to another computer with which the transaction is to be conducted. The said another computer may be a third computer. The system may comprise a plurality of first computers able to initiate transactions as aforesaid, a plurality of third computers operable to execute transactions requested by the first computers, and a second computer common to at least some of the first and third computers and operable to receive a fingerprint associated with a transaction, and to store that fingerprint as verification of that transaction.

Alternatively, the system may comprise a plurality of first computers able to initiate a transaction as aforesaid, and a plurality of further computers, at least one of which is operable to execute transactions requested by the first computers and also to receive a fingerprint associated with each transaction, and to store that fingerprint as verification of that transaction.

A transaction may include the purchase of data which is downloaded to the first computer over the network.

The fingerprint means may comprise software operable as aforesaid.

The, or each of the computers which are connected to the network and are operable to complete transactions requested by the first computer are preferably operable to download the fingerprint means to the first computer. Preferably the fingerprint means is downloaded as part of a dialogue by which the parameters of the transaction are set by operation of the first computer, and wherein the fingerprint means are required to be run to create a fingerprint as aforesaid, before the transaction takes place.

The invention also provides a computer comprising means operable to connect the computer to a network over which transactions can be executed, the computer further comprising fingerprint means operable to seek information relating to the computer in order to create a group of data to serve as a fingerprint which is substantially unique to the computer, and operable when the said computer is operated to initiate a transaction, to provide the fingerprint for transmission to a second computer to allow the source of the transaction initiation to be uniquely defined.

The fingerprint preferably includes data which uniquely identifies components of the system of the first computer. The fingerprint may include data relating to hardware present within the first computer. The fingerprint may include data relating to software present within the first computer. The fingerprint may include data input by the user in response to a prompt provided by the fingerprint means.

The said first computer may comprise transaction means operable to create a transaction request identifying a required transaction, and means operable to transmit the transaction request over the network to another computer with which the transaction is to be conducted. The transaction may include the purchase of data which is downloaded to the first computer over the network.

The fingerprint means may comprise software operable as aforesaid.

The invention also provides a computer comprising means operable to connect the computer to a network over which transaction can be executed, the computer comprising means operable to receive fingerprint data identifying a computer involved in the transaction, and to store the fingerprint data in association with details of the transaction for future reference to identify the said computer involved in the transaction.

Preferably the fingerprint includes data which identifies components of the system of the first computer. The fingerprint may include data relating to hardware present within the first computer, or to software present within the first computer. The fingerprint may include data input by the user in response to a prompt provided by the fingerprint means.

The computer is preferably operable to provide a message confirming that the fingerprint has been stored and the transaction may proceed. The computer may be operable to store, with the fingerprint, the route by which the fingerprint travelled across the network, including details of any servers through which the fingerprint passed. The computer may use the fingerprint to provide active verification of the validity of the transaction. The computer may be operable to effect a payment authorisation in response to receiving details of the transaction. The computer may incorporate a database operable to identify the payment required and/or made in relation to the transaction. The computer may contain stored fingerprint data for comparison with a fingerprint created at the time of a transaction, for authorising the transaction in accordance with the result of the comparison.

The transaction may include the purchase of data which is downloaded over the network.

The invention also provides a computer comprising means operable to connect the computer to a network over which transactions can be executed, and further comprising means operable to receive a transaction request by means of the network, means operable to execute the requested transaction, means operable to receive verification that a fingerprint has been stored in relation to the transaction, and means operable to prevent execution until verification has been received, the fingerprint including information which is substantially unique to the computer requesting the transaction.

The fingerprint preferably includes data which uniquely identifies components of the system of the first computer. The fingerprint may include data relating to hardware present within the first computer, or to software present within the first computer. The fingerprint may include data input by the user in response to a prompt provided by the fingerprint means.

The transaction may include the purchase of data which is downloaded over the network.

The computer is preferably operable to download fingerprint means to a computer requesting a transaction, the fingerprint means being operable to seek information relating to the initiating computer, in order to create a block of data to serve as a fingerprint which is substantially unique to the initiating computer. The fingerprint means is preferably downloaded as part of a dialogue by which the parameters of the transaction are set by operation of the initiating computer.

The invention also provides a data storage medium comprising software operable to seek information relating to the computer on which the software is running, and to create a block of data serving as a fingerprint which is substantially unique to the said computer, the software being further operable to provide the fingerprint for transmission to a second computer when the first computer is operated to initiate a transaction, to allow the source of the transaction initiation to be uniquely identified.

The invention also provides software operable to seek information relating to the computer on which the software is running, and to create a block of data serving as a fingerprint which is substantially unique to the said computer, the software being further operable to provide the fingerprint for transmission to a second computer when the first computer is operated to initiate a transaction, to allow the source of the transaction initiation to be uniquely identified.

The software of either of these aspects may create a fingerprint which includes data which uniquely identifies components of the system of the first computer. The signature may include data relating to hardware or software present within the first computer. The signature may include data input by the user in response to a prompt provided by the fingerprint means.

Figure 2:
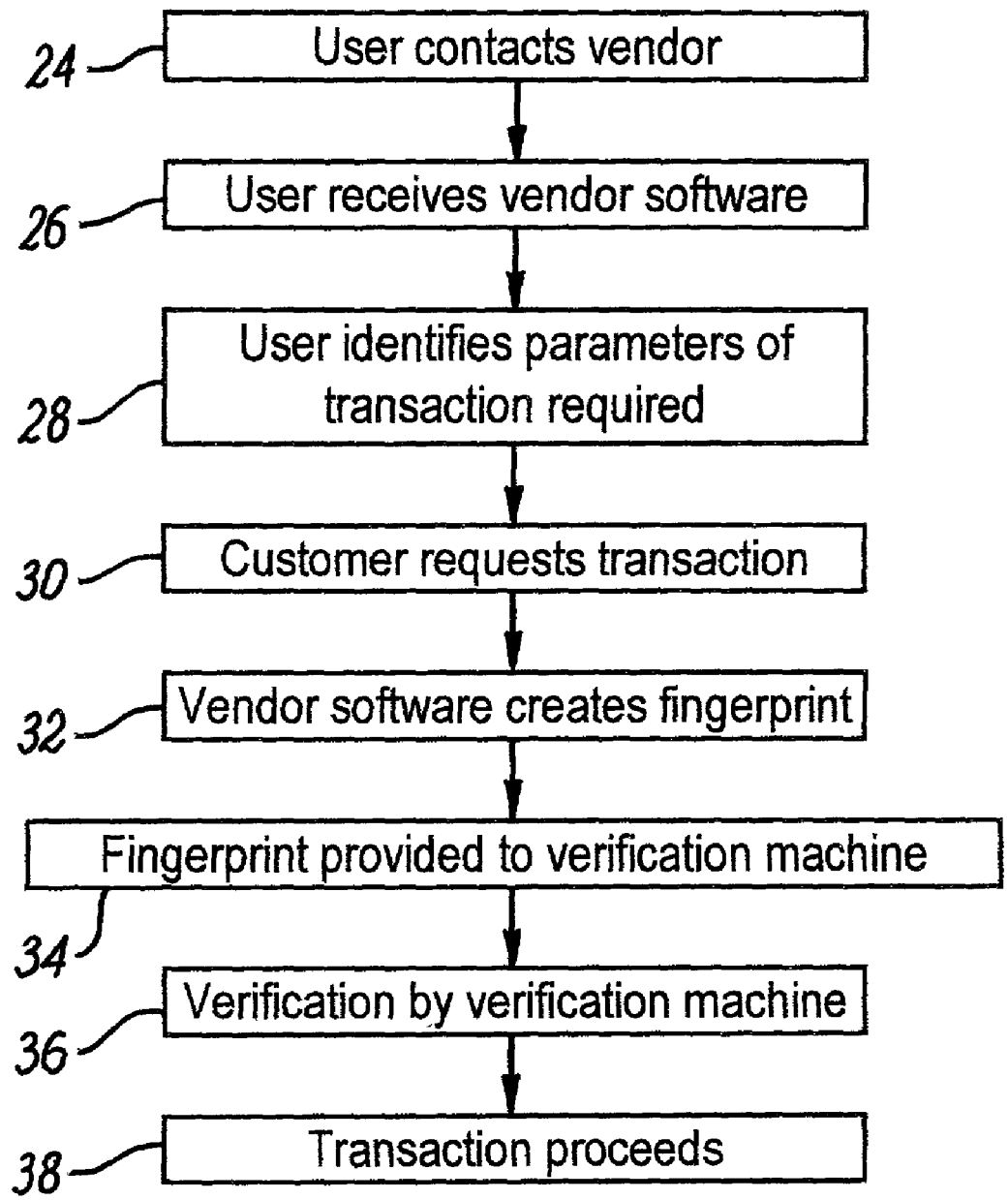

Various examples of systems for implementing the present will now be described in more detail, by way of example only, and with reference to the accompanying drawings, in which:

FIG. 1 is a highly schematic diagram of a computer network by means of which the invention may be implemented; and FIG. 2 is a highly simplified flow diagram of the steps by which the invention is implemented.

FIG. 1 of the drawings shows, in bold, three computers which together form a transaction verification system 10, in accordance with the invention. The system 10 includes a first computer 12, which will be called the customer. A second computer 14 is used for verification and will be termed the verification site. A third computer 16 will be called the vendor. The terms "customer" and "vendor" are chosen because, in this example, commercial transactions are envisaged in which a user operates the customer machine 12 in order to conduct a commercial transaction with the vendor 16, subject to verification provided by the verification site 14.

The computers 12, 14, 16 are connected by a computer network 18, illustrated as double-headed arrows indicating two-way communication between each pair of computers 12, 14, 16. The network 18 may be, for example, the internet. However, it is to be understood that many other forms of network could be used, with appropriate network connections and communication protocols, to ensure that communication equivalent to the connections shown in FIG. 1 can be achieved. It is particularly envisaged that connections may not be direct, as shown in FIG. 1, but via intermediate servers, such as an internet server. An intermediate server is indicated by broken lines at 20, to indicate that this possibility is envisaged in relation to any of the connections.

The computers 12, 14, 16 may be conventional computers such as an IBM PC (personal computer) or equivalent, or other form of computing device. It is envisaged that as technologies develop and merge, the customer machine 12 may be implemented as a multi-purpose machine which incorporates computing power for use in accordance with the invention, and also provides other features, such as mobile communication by telephone or otherwise. In the latter case, the network 18 may be implemented at least partly by wireless transmission, and partly by telephone or other fixed signal transmission arrangements. The verification site 14 and the vendor site 16 may be implemented by more complex computer technology, such as internet servers or the like. In view of the wide range of technologies which could be used, the terms "verification site" and "vendor site" will be used to indicate the hardware and software by which the functions are implemented, without limitation to any particular type of hardware or software, or division of functionality between hardware and software.

The verification site 14 incorporates verification software 14A and a database or other memory device 14B.

The vendor site 16 incorporates vendor software 16A whose operation will be described below, and a further database 16B or other memory device.

Additional customer machines may be incorporated in the network 18, as illustrated in broken lines at 22. Each additional customer machine 22 may be connected directly with the verification site 14 and vendor 16, or by means of a shared network such as the internet. Additional vendor machines (not shown) may also be provided, for instance by other commercial operators.

The vendor software 16A incorporates a module 16C termed here a "fingerprint" module, for reasons which will become apparent.

It is appropriate at this stage to explain briefly the operation of the system 10 in outline terms, by reference to a typical example of the manner in which the system is intended to be used. In this example, the vendor maintains a database 16B of data which may be purchased by a customer and then downloaded to that customer over the network 18. The data may be digitally encoded information such as music recordings, film or video recordings, software or the like. The customer 12 can initiate a transaction, for instance by selecting from the vendor database 16B an item to be purchased and downloaded. However, in order for the vendor 16 to proceed with the transaction, by downloading the data to be purchased, verification will be required from the verification site 14. This, in turn, is not provided until the customer 12 has provided a unique fingerprint to the verification site 14, to be stored in association with the transaction, for future reference in the event that any problem arises in relation to the transaction, such as a payment proving fraudulent, or a user denying having made the transaction.

This process can be described in more detail with reference to FIG. 2. Initially, the user of the customer machine 12 makes contact at 24 with the vendor site 16 over the network 18. The details of the technique for making contact will vary according to the nature of the network, and do not themselves form part of the invention. There may be a plurality of vendor sites 16 connected to the network 18, allowing the user to select from those vendors.

Once contact has been established between the customer machine 12 and the vendor site 16, the customer machine 12 becomes operable to allow the user to make a selection from the data available from the database 16B. This may be achieved at 26 by downloading software for operating the vendor site 16 to allow the customer machine 12 to operate the vendor site 16 while the connection is maintained. Alternatively, the vendor site 16 may be operated by the vendor software 16A, with the software 16A seeking information and instructions from the customer 12, as required. These steps seek to achieve, at 28, identification of the parameters of the required transaction. These parameters may be to identify the data to be downloaded, such as the musical recording which has been chosen.

When the user is satisfied that the correct transaction parameters have been identified at 28, the user requests the transaction to proceed, at 30. In response to this request, the vendor site 16 operates the fingerprint module 16C which in turn serves to download fingerprint software from the vendor site 16 to the customer machine 12. The fingerprint software 16C then installs itself on the customer machine 12 and operates to seek information relating to the customer machine 12. In particular, the information which is sought will include some identification data which is unique or substantially unique to the computer 12. This could be data contained within a typical computing device, such as types or serial numbers for microprocessors, memory devices or other hardware components, types or licence numbers for software installed on a machine, or other data stored in the machine, such as e-mail addresses, internet service provider details, or the like.

The fingerprint software obtains information of this nature by interrogation of the various components and memories within the machine 12 in order to form, at 32, a block of data which is substantially and usually wholly unique to the particular machine 12 which is in use. It is envisaged that data protection legislation may affect what can be used in this way. In particular, it may prevent the use of serial numbers or personal data. Alternatively, it may require the user to be provided with a warning before this type of information is collected, allowing the user to abort the transaction, if desired. However, it is also envisaged that while a type of hardware component will not generally be unique to a particular machine, the combination of types of components and software is more likely to be, resulting in a fingerprint which is useful in identifying a machine without ambiguity. The unique block of data formed in this way is then sent at 34 to the verification site 14. Verification proceeds at 36, as described below, and if successful, the vendor site 16 is instructed at 38 that the verification site 14 has correctly received a fingerprint, and that the transaction is authorised to proceed.

The operations of the verification site 14 in achieving verification of the transaction can vary according to the complexity required in the transaction. In a very simple arrangement, the verification site 14 stores in the database 14B the fingerprint received from the customer machine 12, together with data relating to the transaction, such as a transaction reference number, or full details of the transaction. It is particularly preferred that in addition to the fingerprint provided by the customer 12, the verification site 14 also records data identifying the route by which the fingerprint was transmitted from the customer 12 to the verification site 14. It is conventional in network arrangements such as the internet to add to each message a data word which identifies each server or node through which a message passes, so that the number of such words increases as the message travels from its origin to its destination. Recording this information at the verification site 14 provides an additional check on the fingerprint, by allowing the origin of the message to be identified.

The result is that the verification site 14 will incorporate sufficient information in relation to the transaction to identify the machine used to initiate the transaction (by reference to its physical parameters such as serial numbers etc.). In the event that the location of a machine is not known (which is common in the case of, for instance, the internet) the data relating to the route taken by the fingerprint will allow the user to be identified, at least by reference to the users' identification with an internet service provider or other access arrangement to the network.

It is therefore envisaged that in the event that a transaction is challenged by the user, or is found to be fraudulent, the database 14B will incorporate enough information to identify the user responsible, and to confirm that it was the user's machine which was used. It is expected that the clarity of this information will be sufficient to persuade the user that a queried transaction did in fact take place, or to provide valuable evidence in the case of a fraudulent transaction.

Thus, in a simple implementation of the invention, this data just described will be recorded at the verification site 14, and the signal authorising the transaction to proceed will not be despatched to the vendor 16 until the verification site 14 has successfully stored the requisite data.

In more complex arrangements, it is envisaged that the verification site 14 could additionally handle financial transactions. For instance, the site 14 can be provided with details of the transaction and the customer 12 and can therefore be used to calculate the payment required by the vendor from the customer 12, in consideration of the transaction. This calculation would require the verification site 14 to include a price list or equivalent data, or to be able to access that data from the vendor site 16. In the event that the user was intending to use a credit card or other credit facility to conclude the payment for the transaction, the verification site 14 can be used to make appropriate active verification checks, such as to check the status of a credit card account, and can withhold verification of the transaction until appropriate authorisation has been received from the credit card authority or equivalent authority, and the credit card account has been debited. It will be apparent that in order to achieve this operation, an interface will be required between the verification site 14 and the appropriate holding bank, credit card authority or other finanical institution.

In a further alternative, the verification site 14 could itself be operated as a commercial site with whom the user of the customer machine 12 has a commercial relation as a result of which, the user deposits payment or arranges credit with the operator of the site 14. In this possibility, the site 14 would be provided with a fingerprint of the user and his usual customer machine 12 as part of the arrangements for setting up the commercial relationship between the user and the operator of the site 14. When verification of a transaction is sought, the site 14 can compare the signature provided in relation to the transaction, with signatures previously stored by known users, for comparison. If the site 14 finds that the user has previously been authorised to use the customer machine 12, and that financial parameters such as credit ratings are in order, transaction verification can be provided. If so, an appropriate verification signal is transmitted to the vendor site 16. If not, this would suggest the possibility of fraudulent misuse of the machine 12, or user passwords, etc., so that verification is withheld and the data collected in relation to the route taken by the fingerprint data can then be used to identify and locate the machine 12, thus assisting in the prevention of fraudulent or unauthorised activity.

It will thus be apparent from the above description that the system which has been described achieves the desirable technical effect of providing a secure and substantially unambiguous identification of the customer machine being used to implement a transaction, and therefore, by implication, of the customer operating the machine. The functioning of the system therefore minimises the transactions which later prove to be fraudulent or incorrectly authorised, by providing a technical arrangement to prevent them from occurring. The system is constructed to function in a manner which can be substantially unnoticed by the customer, or to intrude to a minimal extent on the manner in which the customer uses the system.

It will be apparent to the skilled reader that very many variations and modifications can be made to the apparatus and system described above. In particular, there is a very wide range of possible technologies for implementing the network which connects the sites, and each site. The skilled man will have no difficulty in identifying these, or in making appropriate choices for any particular proposed applications. The complexity of information collected for creating the fingerprint can be varied, it being generally true that the greater the amount of information collected, the more confidence there can be that the resulting signature is indeed unique and thus effective for the security and verification purposes envisaged. It may be necessary, or appropriate, to display a message on the customer machine 16, indicating that fingerprint data will be collected as part of the transaction, in order to comply with laws of privacy and data protection.

The description envisages the invention being used in relation to commercial transactions, but is not limited in this respect. The invention could be used to secure other types of transaction, such as access to resources of a remote computer or system.

The description above describes the fingerprint software being downloaded as a separate step. Alternatively, it is envisaged that the fingerprint software is downloaded as part of the data to be purchased, for instance as part of a trial copy of a musical recording. The fingerprint software will then run in the event that the customer decides to download the full version, for which payment is required.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

The invention claimed is:

1. A network system comprising a first computer arrangement and a second computer arrangement connected by a computer network, the second computer arrangement storing data and executable fingerprint software including a plurality of instructions readable and performable by the first computer arrangement, wherein the first computer arrangement is programmed to:

transmit a request for data to the second computer arrangement;

receive the executable fingerprint software from the second computer arrangement;

execute the executable fingerprint software, wherein the first computer arrangement executes the executable fingerprint software by reading and performing the plurality of instructions, whereby the first computer arrangement creates fingerprint data that is substantially unique to the first computer arrangement and transmits the fingerprint data to the second computer arrangement; and receive the requested data from the second computer arrangement, and wherein the second computer arrangement is programmed to:

receive a request for data from the first computer arrangement;

transmit the executable fingerprint software to the first computer arrangement in response to receiving the request;

receive fingerprint data from the first computer arrangement, the fingerprint data being substantially unique to the first computer arrangement; and transmit the requested data to the first computer arrangement in response to receiving the fingerprint data.

2. The system of claim 1, wherein the fingerprint data includes data which identifies components of the first computer arrangement.

3. The system of claim 2, wherein the fingerprint data includes data relating to hardware present within the first computer arrangement, or to software present within the first computer arrangement.

4. The system of claim 2, wherein the fingerprint data further includes data input by a user in response to a prompt provided by the fingerprint software when executed by the first computer arrangement.

5. The system of claim 1, wherein the second computer arrangement is programmed to store the fingerprint data in association with details of the data transferred from the second computer arrangement to the first computer arrangement, for future reference in identifying the first computer arrangement.

6. The system of claim 5, wherein the second computer arrangement is programmed to provide a message confirming that the fingerprint data has been stored.

7. The system of claim 5, wherein the second computer arrangement is programmed to store, with the fingerprint data, the route by which the fingerprint data traveled across the computer network, including details of any servers through which the fingerprint data passed.

8. The system of claim 5, wherein the second computer arrangement incorporates a database operable to identify a payment required in relation to the data requested by the first computer arrangement.

9. The system of claim 5, wherein the second computer arrangement contains stored fingerprint data for comparison with fingerprint data received from the first computer arrangement, and the second computer arrangement is programmed to transmit the requested data to the first computer arrangement in accordance with the result of the comparison.

10. The system of claim 1, wherein the second computer arrangement comprises a vendor computer and a verification computer, the vendor computer storing the data and the fingerprint software, wherein the vendor computer is programmed to:
receive a request for data from the first computer arrangement;
transmit the fingerprint software to the first computer arrangement in response to receiving the request;
receive a verification signal from the verification computer; and
transmit the requested data to the first computer arrangement in response to receiving the verification signal, and wherein the verification computer is programmed to:
receive the fingerprint data from the first computer arrangement; and
transmit a verification signal to the vendor computer in response to receiving the fingerprint data.

11. A client computer connectable to a server computer arrangement over a computer network, the client computer being programmed to:
transmit a request for data to the server computer arrangement;
receive executable fingerprint software from the server computer arrangement in response to transmitting the request for data, the executable fingerprint software including a plurality of instructions readable and performable by the client computer;
execute the executable fingerprint software, wherein the client computer executes the executable fingerprint software by reading and performing the plurality of instructions, whereby the client computer creates fingerprint data that is substantially unique to the client computer and transmits the fingerprint data to the server computer arrangement; and
receive the requested data from the server computer arrangement in response to transmitting the fingerprint data.

12. The client computer of claim 11, wherein the fingerprint data includes data which uniquely identifies components of the client computer.

13. The client computer of claim 12, wherein the fingerprint data includes data relating to hardware present within the client computer.

14. The client computer of claim 12, wherein the fingerprint data includes data relating to software present within the client computer.

15. The client computer of claim 12, wherein the fingerprint data includes data input by a user in response to a prompt provided by the fingerprint software when executed by the client computer.

16. A server computer arrangement connectable to a client computer over a computer network, the server computer arrangement storing data and executable fingerprint software including a plurality of instructions readable and performable by the client computer, wherein the server computer arrangement is programmed to:
receive a request for data from the client computer;
transmit the executable fingerprint software to the client computer in response to receiving the request, the client computer, upon executing the executable fingerprint software by reading and performing the plurality of instructions, creates fingerprint data that is substantially unique to the client computer and transmits the fingerprint data to the server computer arrangement; and
receive fingerprint data from the client computer; and
transmit the requested data to the client computer in response to receiving the fingerprint data.

17. The server computer arrangement of claim 16, wherein the fingerprint data includes data which uniquely identifies components of the client computer.

18. The server computer arrangement of claim 17, wherein the fingerprint data includes data relating to hardware present within the client computer, or to software present within the client computer.

19. The server computer arrangement of claim 16, wherein the fingerprint data includes data input by a user in response to a prompt provided by the fingerprint software when executed by the client computer.

20. The server computer arrangement of claim 16, wherein the server computer arrangement is programmed to provide a message confirming that the fingerprint data has been stored.

21. The server computer arrangement of claim 16, wherein the server computer arrangement is programmed to store, with the fingerprint data, the route by which the fingerprint data traveled across the computer network, including details of any servers through which the fingerprint data passed.

22. The server computer arrangement of claim 16, wherein the server computer arrangement incorporates a database operable to identify the payment required in relation to the data requested by the client computer.

23. The server computer arrangement of claim 16, wherein the server computer arrangement contains stored fingerprint data for comparison with fingerprint data received from the client computer, and the server computer arrangement is programmed to transmit the requested data to the client computer in accordance with the result of the comparison.

24. The server computer arrangement of claim 16, wherein the server computer arrangement comprises a vendor computer and a verification computer, the vendor computer storing the data and the fingerprint software, wherein the vendor computer is programmed to:

receive a request for data from the client computer;

transmit the fingerprint software to the client computer in response to receiving the request;

receive a verification signal from the verification computer; and transmit the requested data to the client computer in response to receiving the verification signal, and wherein the verification computer is programmed to:

receive the fingerprint data from the client computer; and transmit a verification signal to the vendor computer in response to receiving the fingerprint data.

25. A method of operating a network system comprising a first computer arrangement and a second computer arrangement connected by a computer network, wherein:

the first computer arrangement requests data be transferred from the second computer arrangement to the first computer arrangement;

in response to the request, the second computer arrangement transmits executable fingerprint software from the second computer arrangement to the first computer arrangement;

the first computer arrangement executes the executable fingerprint software by reading and performing the plurality of instructions and thereby creates fingerprint data that is substantially unique to the first computer arrangement and transmits the fingerprint data to the second computer arrangement, the second computer arrangement receives the fingerprint data from the first computer arrangement; and in response to receiving the fingerprint data, the second computer arrangement transmits the requested data from the second computer arrangement to the first computer arrangement.

26. The method of claim 25, wherein the fingerprint data includes data which identifies components of the first computer arrangement.

27. The method of claim 26, wherein the fingerprint data includes data relating to hardware present within the first computer arrangement, or to software present within the first computer arrangement.

28. The method of claim 26, wherein execution of the fingerprint software prompts a user of the first computer to provide further data to be included in the fingerprint data.

29. The method of claim 25, wherein the fingerprint data is stored in association with details of the data transferred from the second computer arrangement to the first computer arrangement, for future reference to identify the first computer arrangement.

30. The method of claim 29, wherein a message is provided to confirm that the fingerprint data has been stored.

31. The method of claim 29, wherein the route by which the fingerprint data traveled across the computer network is stored with the fingerprint data, including details of any servers through which the fingerprint data passed.

32. The method of claim 29, wherein fingerprint data is stored by the second computer arrangement and the method further comprises comparing fingerprint data received by the second computer arrangement with the fingerprint data stored by the second computer arrangement, and transmitting the requested data to the first computer arrangement in accordance with the result of the comparison.

33. A data storage medium comprising software, the software being executable by a server computer arrangement connected to a client computer arrangement such that the server computer arrangement is programmed to:

receive a request for data from the client computer arrangement;

transmit executable fingerprint software to the client computer arrangement in response to receiving the request, the fingerprint software including a plurality of instructions readable and performable by the client computer arrangement and, when executed by the client computer arrangement by reading and performing the plurality of instructions, the executable fingerprint software creates fingerprint data that is substantially unique to the client computer arrangement and transmits the fingerprint data to the server computer arrangement;

receive fingerprint data from the client computer arrangement; and transmit the requested data to the client computer arrangement in response to receiving the fingerprint data.

34. The data storage medium of claim 33, wherein the fingerprint software is operable to create fingerprint data which includes data uniquely identifying components of the client computer arrangement.

35. The data storage medium of claim 34, wherein the fingerprint data includes data relating to hardware or software present within the client computer arrangement.

36. The data storage medium of claim 34, wherein the fingerprint data includes data input by a user in response to a prompt provided by the fingerprint software when executed by the client computer arrangement.

37. A network system comprising a client computer, a vendor computer and a verification computer, wherein the client computer is programmed to:

transmit a request for data to the vendor computer;

receive executable fingerprint software, including a plurality of instructions readable and performable by the client computer, from the vendor computer;

execute the executable fingerprint software, wherein the client computer executes the fingerprint software by reading and performing the plurality of instructions and the client computer thereby creates fingerprint data that is substantially unique to the client computer and transmits the fingerprint data to the verification computer; and receive the requested data from the vendor computer, wherein the vendor computer is programmed to:

receive a request for data from the client computer;

transmit the fingerprint software to the client computer in response to receiving the request;

receive a verification signal from the verification computer; and transmit the requested data to the client computer in response to receiving the verification signal, and wherein the verification computer is programmed to:

receive the fingerprint data from the client computer; and transmit a verification signal to the vendor computer in response to receiving the fingerprint data.

* * * * *